US012632446B1

(12) United States Patent
Gajendrakumar

(10) Patent No.: US 12,632,446 B1
(45) Date of Patent: May 19, 2026

(54) MULTI-STAGE LARGE LANGUAGE MODEL PROMPT COMPRESSION

(71) Applicant: SAP SE, Walldorf (DE)

(72) Inventor: Nikhil Gajendrakumar, Los Angeles, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/039,277

(22) Filed: Jan. 28, 2025

(51) Int. Cl.
G06F 16/242 (2019.01)
G06F 16/28 (2019.01)

(52) U.S. Cl.
CPC .......... G06F 16/243 (2019.01); G06F 16/285 (2019.01)

(58) Field of Classification Search
CPC ............................ G06F 16/243; G06F 16/285
See application file for complete search history.

(56) References Cited

U.S. PATENT DOCUMENTS

| | | | | |
|---|---|---|---|---|
| 12,530,348 B2 * | 1/2026 | Kamble | ................ | G06F 16/243 |
| 2024/0126795 A1 * | 4/2024 | Zhong | .................... | H04L 51/02 |
| 2025/0094455 A1 * | 3/2025 | Bista | .................. | G06F 16/3329 |
| 2026/0023787 A1 * | 1/2026 | McVeigh | .......... | G06F 16/90332 |

* cited by examiner

*Primary Examiner* — Jay A Morrison
(74) *Attorney, Agent, or Firm* — SCHWEGMAN LUNDBERG & WOESSNER, P.A.

(57) ABSTRACT

In an example embodiment, prompt compression is used in two different places in the LLM query pipeline to reduce the size of LLM queries, which reduces the time it takes for an LLM to respond to a query and improves scalability. Specifically, the conversation history itself may be run through a token compressor, which acts to eliminate unnecessary tokens from the conversation history and thus also from a rewritten version of the query. Additionally, the context chunks retrieved during RAG are themselves run through a token compressor to eliminate unnecessary tokens from the context chunks. The compressed context chunks and the rewritten query are then passed to the LLM for processing, and since both the context chunks and the rewritten query contain compressed elements, the result is that the LLM processes fewer tokens to respond to the query.

20 Claims, 4 Drawing Sheets

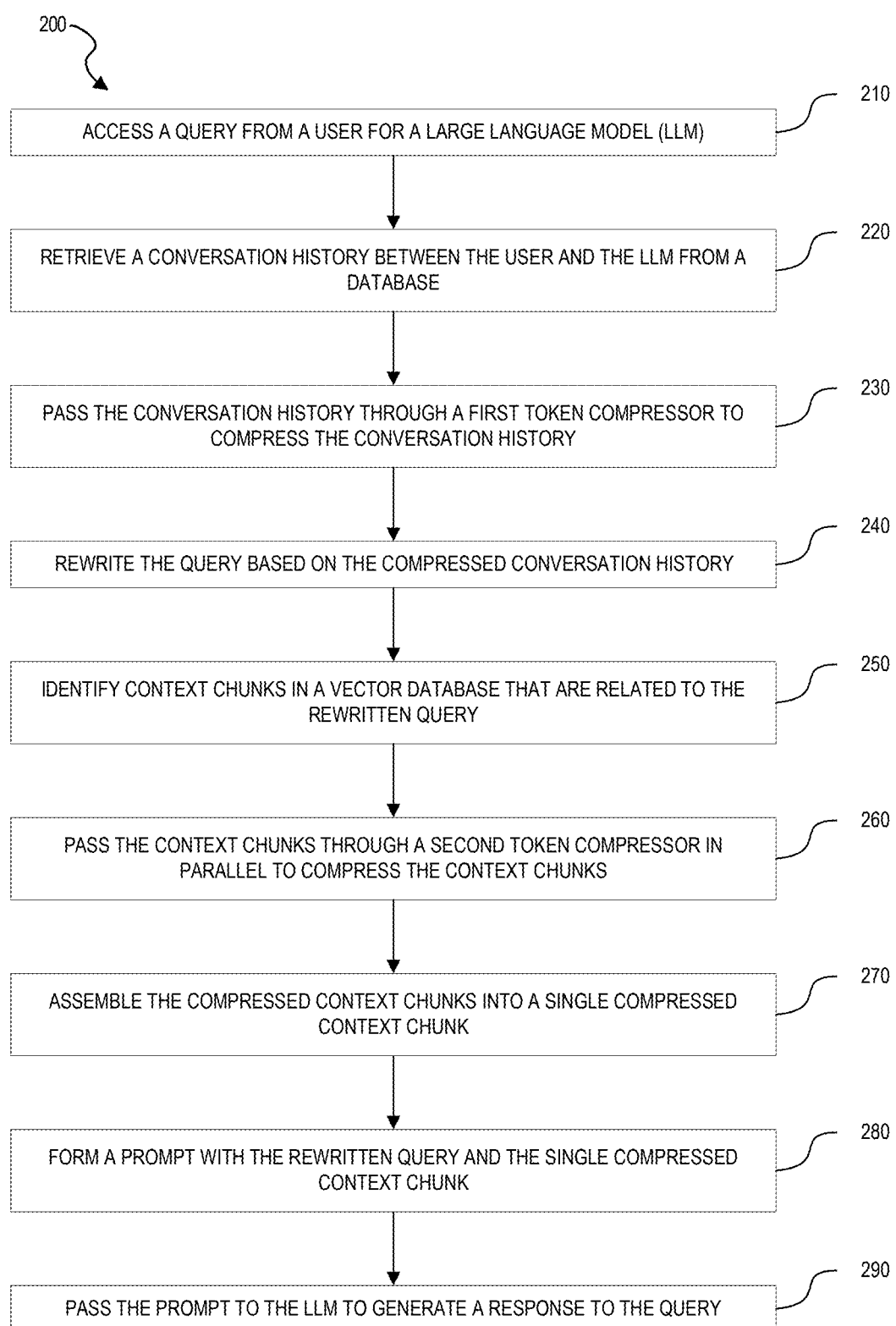

200

ACCESS A QUERY FROM A USER FOR A LARGE LANGUAGE MODEL (LLM) — 210

RETRIEVE A CONVERSATION HISTORY BETWEEN THE USER AND THE LLM FROM A DATABASE — 220

PASS THE CONVERSATION HISTORY THROUGH A FIRST TOKEN COMPRESSOR TO COMPRESS THE CONVERSATION HISTORY — 230

REWRITE THE QUERY BASED ON THE COMPRESSED CONVERSATION HISTORY — 240

IDENTIFY CONTEXT CHUNKS IN A VECTOR DATABASE THAT ARE RELATED TO THE REWRITTEN QUERY — 250

PASS THE CONTEXT CHUNKS THROUGH A SECOND TOKEN COMPRESSOR IN PARALLEL TO COMPRESS THE CONTEXT CHUNKS — 260

ASSEMBLE THE COMPRESSED CONTEXT CHUNKS INTO A SINGLE COMPRESSED CONTEXT CHUNK — 270

FORM A PROMPT WITH THE REWRITTEN QUERY AND THE SINGLE COMPRESSED CONTEXT CHUNK — 280

PASS THE PROMPT TO THE LLM TO GENERATE A RESPONSE TO THE QUERY — 290

*FIG. 2*

MULTI-STAGE LARGE LANGUAGE MODEL PROMPT COMPRESSION

TECHNICAL FIELD

This document generally relates to computer systems. More specifically, this document relates to use of multi-stage prompt compression for large language models.

BACKGROUND

A large language model (LLM) refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

FIG. 2 is a flow diagram illustrating a method for improving performance of an LLM, in accordance with an example embodiment.

DETAILED DESCRIPTION

Figure 1:
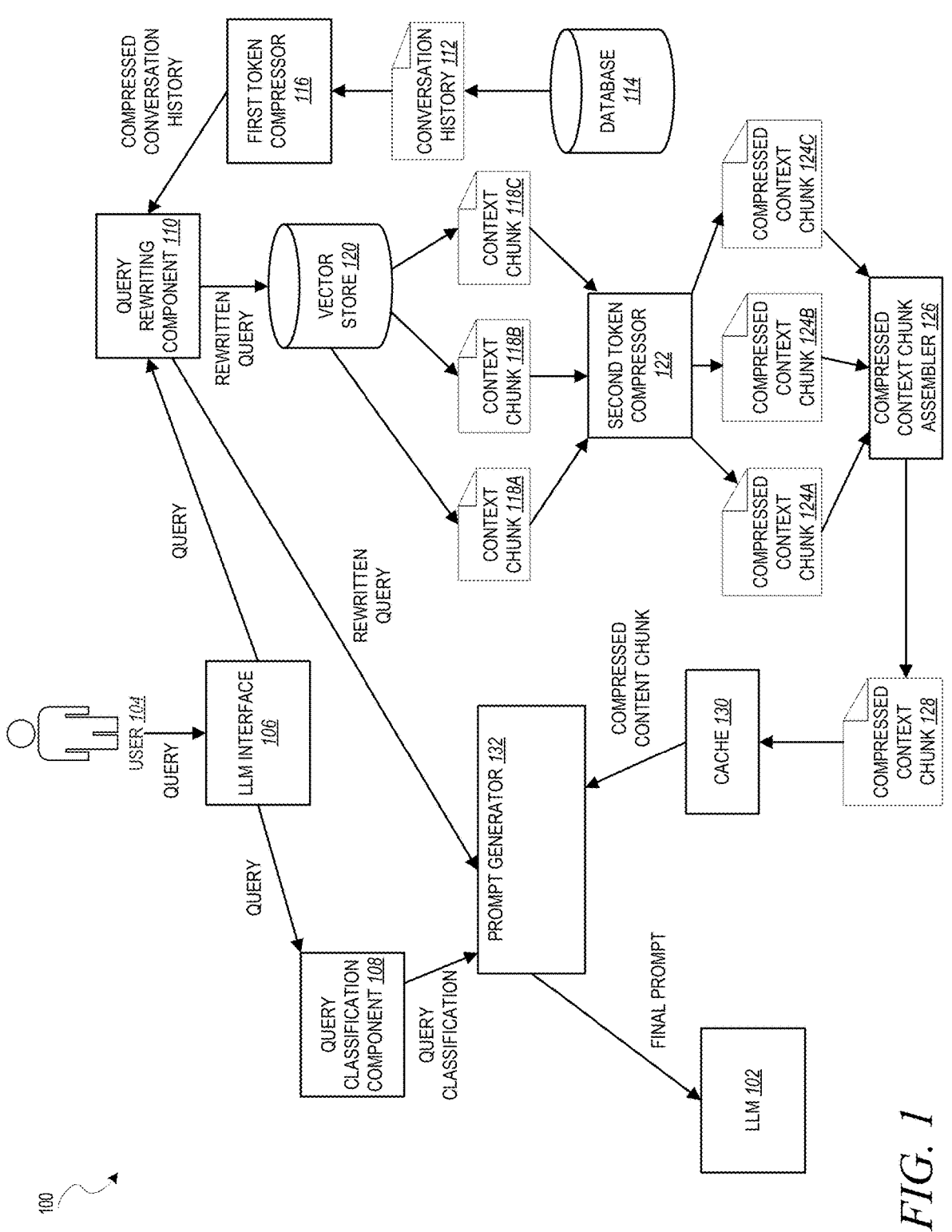
FIG. 1 is a block diagram illustrating a system for improving performance of an LLM, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

A technical issue that can arise in LLMs is that scalability can become a problem. As the numbers of features and complexity of generation requests increase, the requests themselves can become too large for the LLM to handle, or at least handle well. Many LLMs have a hard limit on the number of input tokens, not only because large token inputs can increase costs but also because the processing time can exponentially increase as the number of tokens increases. This is especially true when many different LLM requests are being received from many different users at or around the same time.

Additionally, query classification and retrieval augmented generation (RAG) are techniques that can be used to increase the reliability of generated output by LLMs. Query classification involves using machine learning models to understand the nature of the query, such as the intent behind the query and the category of queries to which the query belongs.

RAG is a framework that combines traditional retrieval techniques with generative models to improve the quality of generated responses, particularly in tasks like question answering or conversational agents. In RAG, the process typically involves two main steps:

Retrieval: The system first retrieves relevant documents or pieces of information (sometimes called "context chunks") from a large database or knowledge base based on the input query. This can be performed using techniques like search algorithms or vector embeddings to find the most pertinent information.

Generation: After retrieving relevant information, a generative model (like an LLM) processes this data to produce a coherent and contextually appropriate response. The model can leverage the retrieved content to enhance its answers, making them more accurate and informative.

The combination allows the model to provide richer, more context-aware responses than it could generate from scratch, tapping into a larger body of knowledge while still being able to generate natural language responses. The responses may be based on specifically cohesive content.

Use of query classification and RAG, however, only add to the issues caused when scaling systems that query LLMs.

Another technique that is used to improve reliability of LLM output is query rewriting. In query rewriting, the query may be rewritten based on a conversation history, which provides additional context to the query. Often this involves appending the conversation history to the query. This, of course, makes the query longer (more tokens) and thus more apt to cause issues with scalability and expense.

In an example embodiment, prompt compression is used in two different places in the LLM query pipeline to reduce the size of LLM queries, which reduces the time it takes for an LLM to respond to a query and improves scalability. Specifically, the conversation history itself may be run through a token compressor, which acts to eliminate unnecessary tokens from the conversation history and thus also from a rewritten version of the query. Additionally, the context chunks retrieved during RAG are themselves run through a token compressor to eliminate unnecessary tokens from the context chunks. The compressed context chunks and the rewritten query are then passed to the LLM for processing, and since both the context chunks and the rewritten query contain compressed elements, the result is that the LLM processes fewer tokens to respond to the query.

FIG. 1 is a block diagram illustrating a system 100 for improving performance of an LLM 102, in accordance with an example embodiment. A user 104 submits a query to an LLM interface 106. The LLM interface 106 may take many forms, including, for example, chatbots/conversational interfaces, voice-based interfaces, text editors, search engines, etc.

The LLM interface 106 sends the query to a query classification component 108, which acts to classify the query. The query classification component 108 may rely on the use of one or more machine learning models to provide the classification. In some example embodiments, these machine learning models may include the LLM 102 itself. In other example embodiments, these machine learning models may include one or more non-LLM machine learning models, such as Support Vector Machines (SVMs), Random Forests, or Naive Bayes classifiers might be trained on a labeled dataset of queries. These models would learn patterns in the data to predict the category of a new query. They rely on features such as n-grams, part-of-speech tagging, or other linguistic features extracted from the query to make predictions.

The LLM interface 106 also sends the query to a query rewriting component 110. The query rewriting component 110 acts to rewrite the query using a conversation history 112 obtained from a database 114. In some example embodiments, the database 114 is a relational database management system. Prior to the query rewriting component rewriting the query based on the conversation history, however, the conversation history is passed through a first token compressor 116. The first token compressor 116 compresses the conversation history. This involves shrinking or removing some of the tokens within the conversation history, attempting to do so without altering any contextual meaning of the conversation history.

It should be mentioned that while the first token compressor 116 can be a prompt compressor that is used to compress the conversation history.

One of the main ways to achieve prompt compression is through summarization. Instead of providing a long and detailed input, a condensed version is created that highlights the most critical points. This summary retains the key information while reducing unnecessary details.

Another approach to compression is extracting key pieces of information that are most relevant to the task. Rather than inputting large paragraphs, the prompt can focus on specific keywords, phrases, or facts that are central to the query. For instance, if a query discusses a historical event, the compressed conversation history could only include important dates, figures, or events, without excess context.

Prompt compression can also involve restructuring the conversation history to make it more concise and structured. By reformatting the conversational history into clear, direct questions or statements and answers, the size of the conversation history can be reduced. A vague or long-winded conversation history can be reframed into a more focused version with explanation but still conveys the needed context.

In some advanced applications, embeddings are used as a form of compression. Embeddings are vectorized representations of the text that capture the meaning of the input in a more compact form. These can be passed to the model instead of the original text, reducing the number of tokens that need to be processed while still conveying the same semantic content.

Another technique for prompt compression involves filtering out irrelevant information. Using predefined rules or machine learning models, the system can identify and discard parts of the input that are not directly related to the query, thereby ensuring that only the most relevant information is passed to the model.

One example of a prompt compressor is LLMLingua from Microsoft Corporation of Redmond, Washington.

The query rewriting component 110 then rewrites the query using the compressed conversation history. This may involve appending the compressed conversation history to the query or otherwise combining them.

The rewritten query can be used to identify related context chunks 118A, 118B, 118C in a vector store 120. This is part of the RAG process.

In the case of vector embeddings, a vector embedding is a set of coordinates in a latent n-dimensional space such that the proximity (e.g., cosine distance) of the coordinates to other coordinates is indicative of the similarity of the information embedded to those coordinates. In an example embodiment, the embedding is a high-dimensional (e.g., 1536-dimension) floating point vector, and the texts with similar semantics will have the corresponding similar embeddings.

Thus, in one example embodiment, vector embeddings may be combined with RAG to provide improved LLM generation. Specifically, an embedding machine learning model is trained on a large corpus of text and then used to perform the embedding of the underlying text into embeddings. This allows similar pieces of text to be identified even from text that is different. For example, text including the term "apartment" may be similar to text including the term "flat", even though their words are completely different. Thus, the embeddings for these two words may be geometrically close to each other in the latent n-dimensional space.

The context chunks 118A, 118B, 118C can then be passed to a second token compressor 122. The second token compressor 122 may perform prompt compression in a similar manner as the first token compressor. In some example embodiments it may be specifically designed to compress context chunks. In other example embodiments, the first token compressor 116 and the second token compressor 122 may be the same token compressor.

The output of the second token compressor 122 is a series of compressed context chunks 124A, 124B, 124C. These compressed context chunks 124A, 124B, 124C are then assembled at a compressed context chunk assembler 126 into a single compressed context chunk 128, which may be stored in a cache 130. Sorting the compressed chunks avoids redundant computation in future queries involving the same context. This may be common in systems that are designed to work within a single industry or line of business, as frequently users in those environments will issue similar or identical queries.

The single compressed chunk 128, query classification from the query classification component 108, and the rewritten query from the query rewriting component 110 are then used by a prompt generator 132 to form a final prompt, which can then be fed into the LLM 102 to generate a response.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance. The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero-sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, although a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well, or not, the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

Referring back to FIG. 1, in some additional embodiments, in some additional embodiments, prompt compressor (which can either be a stand-alone prompt compressor or be a prompt compressor that is shared among the first token compressor 116 and/or second token compressor 122) is used to compress the final prompt prior to it being submitted to the LLM 102. For simplicity this is not depicted in this figure.

An example of token compression may be presented herein. A phone call transcript included in the vector database may include the following:

(1) Alex: So, um, I've been thinking you know, about our upcoming presentation and I feel like we should, uh, maybe change the design a bit. I mean, we want it to be, like, really engaging, right? So, you know, perhaps we could add some more visuals.

(2) Taylor: Yeah, I totally get what you're saying. Alex, I mean, we want to capture their attention, you know? So, like, adding more visuals could, you know, make it more appealing. I think we should definitely consider that.

Each person's side of the interaction may be considered to be a different contextual chunk. Thus, (1) and (2) can be passed to the token compressor, resulting in the following compressed contextual chunks:

(1) Alex: thinking, about upcoming presentation, feel change design, want, engaging? add more visuals.

(2) Taylor: get what you re saying, Alex. Want capture their attention? adding more visuals could, make more appealing. consider that.

FIG. 2 is a flow diagram illustrating a method 200 for improving performance of an LLM, in accordance with an example embodiment.

At operation 210, a query from a user for an LLM is accessed. This query may be directly received from the user or may be generated on behalf of the user based on an understanding of the user's intent, such as from graphical user interface selections. At operation 220 a conversation history between the user and the LLM is retrieved from a database. This database may be, for example, an RDBMS.

At operation 230, the conversation history is passed through a first token compressor to compress the conversation history. At operation 240, the query is rewritten based on the compressed conversation history. This may include appending the compressed conversation history to the query, At operation 250, context chunks in a vector database that are related to the rewritten query are retrieved. This may be performed using embeddings. At operation 260, the context chunks are passed through a second token compressor to compress the context chunks. The second token compressor may be the same as the first token compressor, and both or either may be a prompt compressor. At operation 270, the compressed context chunks are assembled into a single compressed context chunk.

At operation 280, a prompt is formed with the rewritten query and the single compressed context chunk. At operation 290, the prompt is passed to the LLM to generate a response to the query.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: accessing a query from a user for a large language model (LLM); retrieving a conversation history between the user and the LLM from a database; passing the conversation history through a first token compressor to compress the conversation history; rewriting the query based on the compressed conversation history; identifying context chunks in a vector database that are related to the rewritten query; passing the context chunks through a second token compressor to compress the context chunks; assembling the compressed context chunks into a single compressed context chunk; forming a prompt with the rewritten query and the single compressed context chunk; and passing the prompt to the LLM to generate a response to the query.

In Example 2, the subject matter of Example 1, wherein the first token compressor and the second token compressor are a single shared token compressor.

In Example 3, the subject matter of Example 2, wherein the single shared token compressor is a prompt compressor.

In Example 4, the subject matter of Examples 1-3, wherein the identifying context chunks utilizing embeddings.

In Example 5, the subject matter of Examples 1-4, wherein the operations further comprise: using a machine learning model to generate a classification for the query; and wherein the forming comprises forming the prompt with the rewritten query, the single compressed context chunk, and the classification.

In Example 6, the subject matter of Examples 1-5, wherein the operations further comprise compressing the prompt using a prompt compressor prior to passing the prompt to the LLM.

In Example 7, the subject matter of Examples 5-6, wherein the operations further comprise compressing the prompt using a prompt compressor prior to passing the prompt to the LLM.

Example 8 is a method comprising: accessing a query from a user for a large language model (LLM); retrieving a conversation history between the user and the LLM from a database; passing the conversation history through a first token compressor to compress the conversation history; rewriting the query based on the compressed conversation history; identifying context chunks in a vector database that are related to the rewritten query; passing the context chunks through a second token compressor to compress the context chunks; assembling the compressed context chunks into a single compressed context chunk; forming a prompt with the rewritten query and the single compressed context chunk; and passing the prompt to the LLM to generate a response to the query.

In Example 9, the subject matter of Example 8 includes, wherein the first token compressor and the second token compressor are a single shared token compressor.

In Example 10, the subject matter of Example 9, wherein the single shared token compressor is a prompt compressor.

In Example 11, the subject matter of Examples 8-10, wherein the identifying context chunks utilizing embeddings.

In Example 12, the subject matter of Examples 8-11, using a machine learning model to generate a classification for the query; and wherein the forming comprises forming the prompt with the rewritten query, the single compressed context chunk, and the classification.

In Example 13, the subject matter of Examples 8-12, compressing the prompt using a prompt compressor prior to passing the prompt to the LLM.

In Example 14, the subject matter of Examples 12-13, compressing the prompt using a prompt compressor prior to passing the prompt to the LLM.

Example 15 is a non-transitory machine-readable medium storing instructions which, when executed by one or more processors, cause the one or more processors to perform operations comprising: accessing a query from a user for a large language model (LLM); retrieving a conversation history between the user and the LLM from a database; passing the conversation history through a first token compressor to compress the conversation history; rewriting the query based on the compressed conversation history; identifying context chunks in a vector database that are related to the rewritten query; passing the context chunks through a second token compressor to compress the context chunks; assembling the compressed context chunks into a single compressed context chunk; forming a prompt with the rewritten query and the single compressed context chunk; and passing the prompt to the LLM to generate a response to the query.

In Example 16, the subject matter of Example 15 includes, wherein the first token compressor and the second token compressor are a single shared token compressor.

In Example 17, the subject matter of Example 16, wherein the single shared token compressor is a prompt compressor.

In Example 18, the subject matter of Examples 15-17, wherein the identifying context chunks utilizing embeddings.

In Example 19, the subject matter of Examples 15-18, wherein the operations further comprise: using a machine learning model to generate a classification for the query; and wherein the forming comprises forming thea prompt with the rewritten query, the single compressed context chunk, and the classification.

In Example 20, the subject matter of Examples 15-19, wherein the operations further comprise compressing the prompt using a prompt compressor prior to passing the prompt to the LLM.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 3:
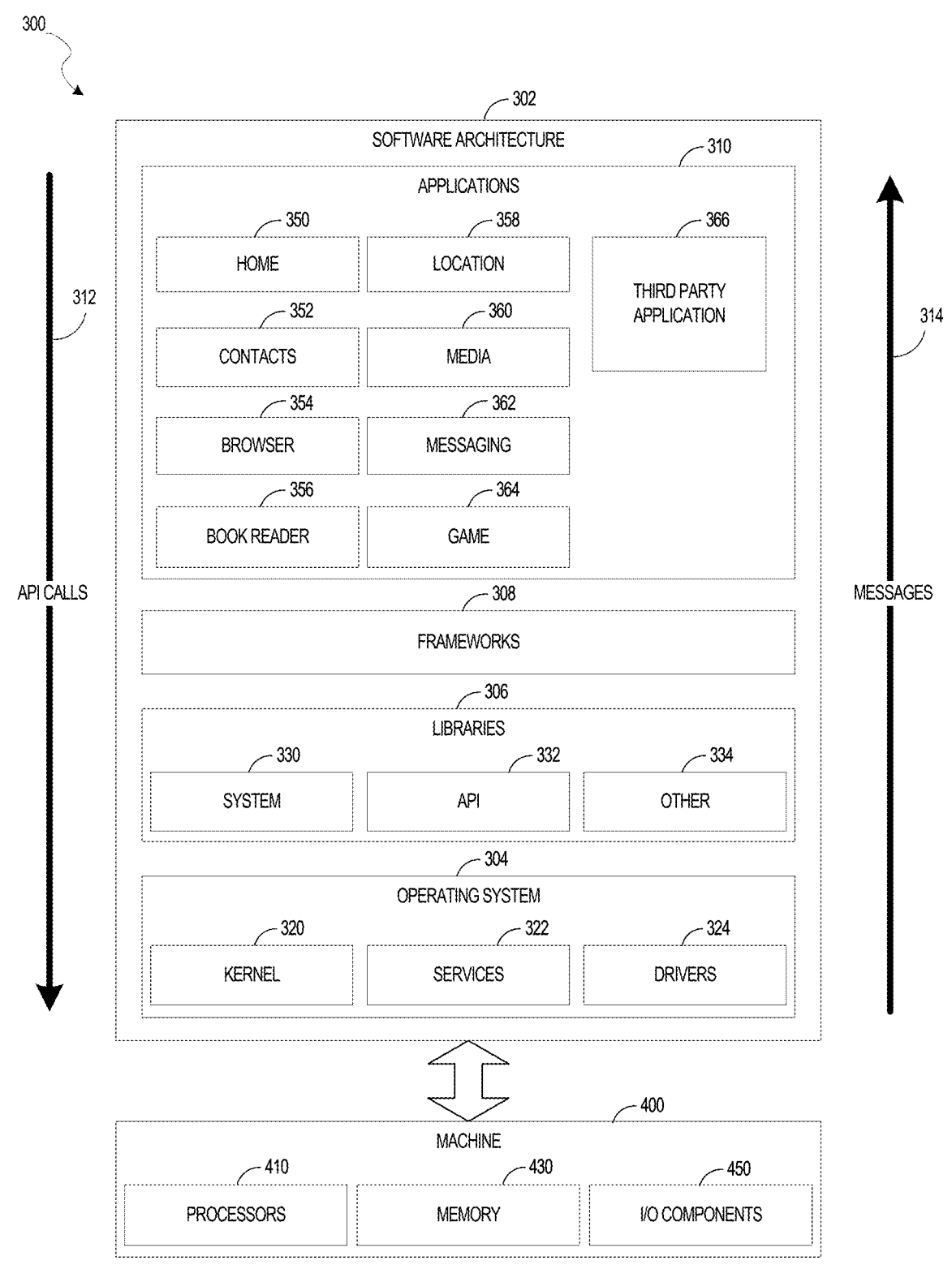
FIG. 3 is a block diagram illustrating an architecture of software for embedding searches, which can be installed on any one or more devices.

FIG. 3 is a block diagram 300 illustrating a software architecture 302, which can be installed on any one or more of the devices described above. FIG. 3 is merely a nonlimiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 306, frameworks 308, and applications 310. Operationally, the applications 310 invoke API calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionalities. The services 322 can provide other common services for the other software layers. The drivers 324 are responsible for controlling or interfacing with the underlying hardware, according to some embodiments. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics [PNG]), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310, according to some embodiments. For example, the frameworks 308 provide various GUI functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. According to some embodiments, the applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 and send messages 314 to facilitate functionality described herein.

Figure 4:
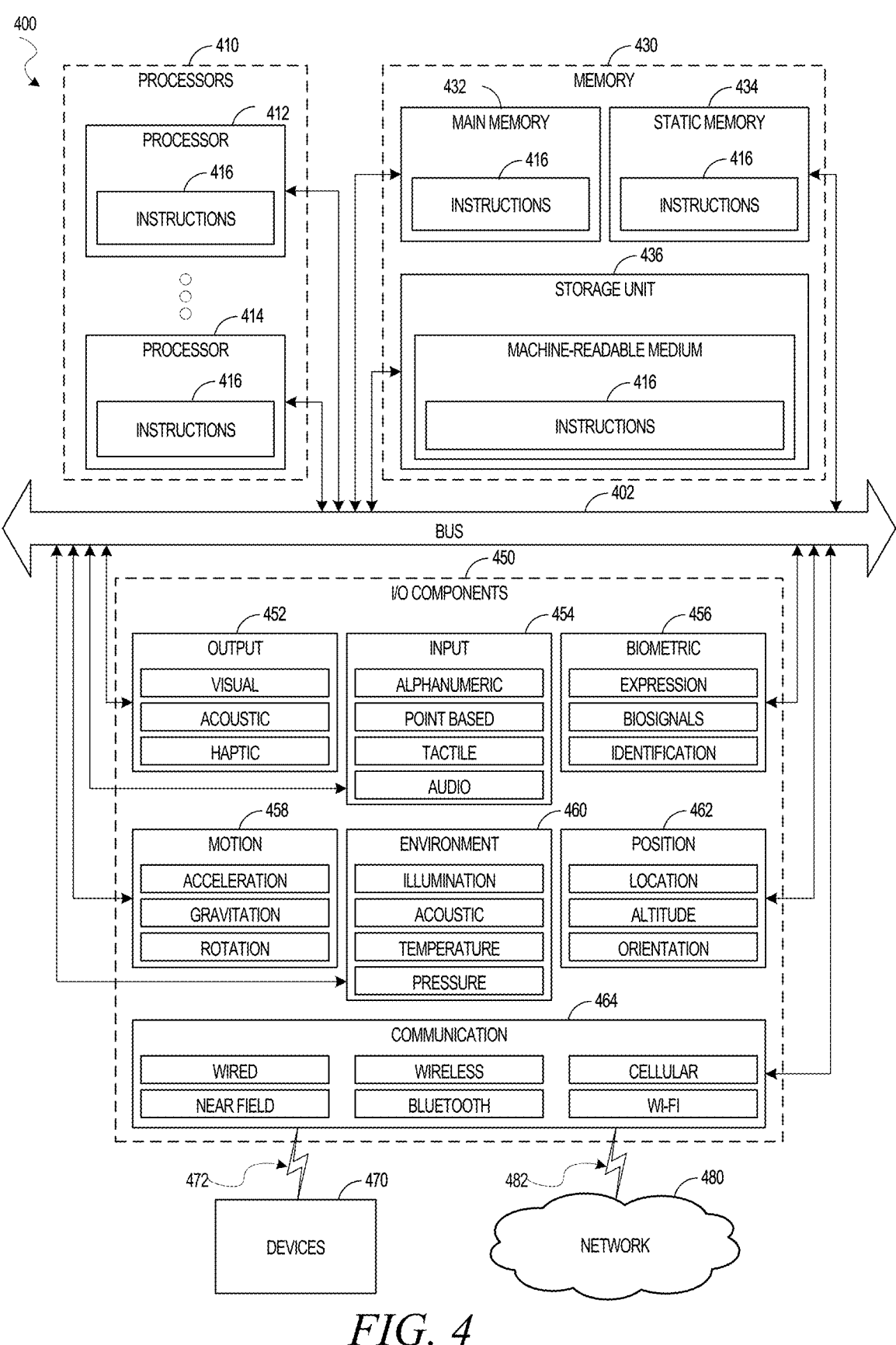
FIG. 4 illustrates a diagrammatic representation of a machine in the form of a computer system within which a set of instructions may be executed for causing the machine to perform any one or more of the methodologies discussed herein, according to an example embodiment.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method 200 of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid crystal display (LCD), a projector, or a cathode ray tube [CRT]), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (e.g., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium"

mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
accessing a query from a user for a large language model (LLM);
retrieving a conversation history between the user and the LLM from a database;
passing the conversation history through a first token compressor to compress the conversation history;
rewriting the query based on the compressed conversation history;
identifying context chunks in a vector database that are related to the rewritten query;
passing the context chunks through a second token compressor to compress the context chunks;
assembling the compressed context chunks into a single compressed context chunk;
forming a prompt with the rewritten query and the single compressed context chunk;
passing the prompt to the LLM to generate a response to the query; and
receiving the generated response output by the LLM.

2. The system of claim 1, wherein the first token compressor and the second token compressor are a single shared token compressor.

3. The system of claim 2, wherein the single shared token compressor is a prompt compressor.

4. The system of claim 1, wherein the identifying context chunks utilizing embeddings.

5. The system of claim 1, wherein the operations further comprise:
using a machine learning model to generate a classification for the query; and
wherein the forming comprises forming the prompt with the rewritten query, the single compressed context chunk, and the classification.

6. The system of claim 1, wherein the operations further comprise compressing the prompt using a prompt compressor prior to passing the prompt to the LLM.

7. The system of claim 5, wherein the operations further comprise compressing the prompt using a prompt compressor prior to passing the prompt to the LLM.

8. A method comprising:
accessing a query from a user for a large language model (LLM);
retrieving a conversation history between the user and the LLM from a database;
passing the conversation history through a first token compressor to compress the conversation history;
rewriting the query based on the compressed conversation history;

identifying context chunks in a vector database that are related to the rewritten query;

passing the context chunks through a second token compressor to compress the context chunks;

assembling the compressed context chunks into a single compressed context chunk;

forming a prompt with the rewritten query and the single compressed context chunk;

passing the prompt to the LLM to generate a response to the query; and receiving the generated response output by the LLM.

9. The method of claim 8, wherein the first token compressor and the second token compressor are a single shared token compressor.

10. The method of claim 9, wherein the single shared token compressor is a prompt compressor.

11. The method of claim 8, wherein the identifying context chunks utilizes embeddings.

12. The method of claim 8, further comprising:

using a machine learning model to generate a classification for the query; and wherein the forming comprises forming the prompt with the rewritten query, the single compressed context chunk, and the classification.

13. The method of claim 8, further comprising compressing the prompt using a prompt compressor prior to passing the prompt to the LLM.

14. The method of claim 12, further comprising compressing the prompt using a prompt compressor prior to passing the prompt to the LLM.

15. A non-transitory machine-readable medium storing instructions which, when executed by one or more processors, cause the one or more processors to perform operations comprising:

accessing a query from a user for a large language model (LLM);

retrieving a conversation history between the user and the LLM from a database;

passing the conversation history through a first token compressor to compress the conversation history;

rewriting the query based on the compressed conversation history;

identifying context chunks in a vector database that are related to the rewritten query;

passing the context chunks through a second token compressor to compress the context chunks;

assembling the compressed context chunks into a single compressed context chunk;

forming a prompt with the rewritten query and the single compressed context chunk;

passing the prompt to the LLM to generate a response to the query; and receiving the generated response output by the LLM.

16. The non-transitory machine-readable medium of claim 15, wherein the first token compressor and the second token compressor are a single shared token compressor.

17. The non-transitory machine-readable medium of claim 16, wherein the single shared token compressor is a prompt compressor.

18. The non-transitory machine-readable medium of claim 15, wherein the identifying context chunks utilizing embeddings.

19. The non-transitory machine-readable medium of claim 15, wherein the operations further comprise:

using a machine learning model to generate a classification for the query; and wherein the forming comprises forming the prompt with the rewritten query, the single compressed context chunk, and the classification.

20. The non-transitory machine-readable medium of claim 15, wherein the operations further comprise compressing the prompt using a prompt compressor prior to passing the prompt to the LLM.

* * * * *